United States Patent
Gräfer et al.

(10) Patent No.: US 7,016,768 B2
(45) Date of Patent: Mar. 21, 2006

(54) CONVEYOR SYSTEM FOR TRANSPORTING ARTICLES, IN PARTICULAR CONTAINERS FOR BAGGAGE PIECES, AND METHOD FOR CONTROLLING SUCH A CONVEYOR SYSTEM

(75) Inventors: Dominik Gräfer, Nürnberg (DE); Albrecht Hoene, Herzogenaurach (DE); Wolfgang Brixius, Neunkirchen A. Br (DE)

(73) Assignee: Siemens Aktiengesellschaft, München (DE)

( * ) Notice: Subject to any disclaimer, the term of this patent is extended or adjusted under 35 U.S.C. 154(b) by 61 days.

(21) Appl. No.: 10/730,880

(22) Filed: Dec. 9, 2003

(65) Prior Publication Data

US 2004/0134754 A1 Jul. 15, 2004

(30) Foreign Application Priority Data

Dec. 9, 2002 (DE) ................................ 102 57 466

(51) Int. Cl.
*G06F 7/00* (2006.01)
(52) U.S. Cl. ...................... 700/230; 198/572; 198/573; 198/459.8; 198/461.1; 198/464.2; 198/460.1
(58) Field of Classification Search ................ 700/230, 700/213, 228, 112; 198/459.8, 460.1, 461.1, 198/464.1, 464.2, 572, 573, 575, 577
See application file for complete search history.

(56) References Cited

U.S. PATENT DOCUMENTS

| | | | | |
|---|---|---|---|---|
| 5,814,772 A | * | 9/1998 | Nishimura et al. | ......... 177/145 |
| 6,471,039 B1 | * | 10/2002 | Bruun et al. | ................. 198/577 |
| 6,895,303 B1 | * | 5/2005 | Krumm et al. | ............. 700/223 |
| 6,897,625 B1 | * | 5/2005 | Brixius et al. | ................ 318/69 |
| 2002/0063037 A1 | | 5/2002 | Bruun et al. | |

FOREIGN PATENT DOCUMENTS

| | | |
|---|---|---|
| EP | 0 818 406 A | 1/1998 |
| JP | 09 142638 A | 6/1997 |

* cited by examiner

*Primary Examiner*—Khoi H. Tran

(74) *Attorney, Agent, or Firm*—Henry M. Feiereisen

(57) ABSTRACT

A system and method is described for transporting articles, in particular for transporting container holding baggage pieces. At least two endless conveyor belts are sequentially arranged to define an upstream conveyor belt and a downstream conveyor belt for transport of articles in a transport direction from the upstream conveyor belt to the downstream conveyor belt. The conveyor belts are driven by drive-motors, in particular asynchronous motors, with the rotation speed of each drive motor being regulated depending on the weight of the articles located on the conveyor belt associated with the particular drive motor. The drive motors can be controlled by adjusting the frequency and/or voltage of the supplied electric power.

6 Claims, 3 Drawing Sheets

CONVEYOR SYSTEM FOR TRANSPORTING ARTICLES, IN PARTICULAR CONTAINERS FOR BAGGAGE PIECES, AND METHOD FOR CONTROLLING SUCH A CONVEYOR SYSTEM

CROSS-REFERENCES TO RELATED APPLICATIONS

This application claims the priority of German Patent Application, Ser. No. 102 57 466.9, filed Dec. 9, 2002, pursuant to 35 U.S.C. 119(a)–(d), the disclosure of which is incorporated herein by reference.

BACKGROUND OF THE INVENTION

The present invention relates to a conveyor system for transporting articles, in particular containers for baggage pieces. The present invention further relates to a control method for such a conveyor system.

It is known to use conveyors for transporting articles, such as baggage pieces, for example at airports. One or more baggage pieces are, for example, placed in a suitable container. The conveyor, which is typically understood to include a conveying element with a drive, a conveyor belt, cross members, etc., is here composed of several conveyer sections, each of which includes an endless conveyor belt and a drive motor. The conveyor sections are connected sequentially in such a way that the conveyor belts transfer the containers that are transported by the conveyor belts in the transport direction, so as to enable the baggage pieces in the containers to be transported from a start position to a target position. In addition, the conveyor can also serve as an intermediate storage unit for the baggage pieces. A baggage piece deposited the evening before departure date can travel continuously in a circle during the night. The conveyor deposits the baggage pieces at the target position only shortly before the scheduled departure time for subsequent loading onto the aircraft.

The transport speed of the conveyor sections thereby depends on the transported articles. The different transport speeds reduce the capacity of the intermediate storage unit and make data tracking and/or handling of an individual item difficult.

To improve this situation, the conveyor belts in a conveyor section are either shortened so as to transport as a smaller number of articles on the conveyor belt, or controlled drives with a feedback of the rotation speed are employed. Servo motors with a stabilized rotation speed can also be used. Conveyors of this type are relatively expensive.

FIG. 3 shows a conventional conveyor system 1 including an upstream conveyor 2 and a downstream conveyor 3 at various points in time $t_1$ to $t_9$. The transport direction is indicated by the arrow 4. In the schematic illustration of FIG. 3, the conveyor 2 is depicted by a conveyor belt 6, whereas the conveyor 3 is depicted by the conveyor belt 7. Articles 5, transported on a conveyor belt 6, 7 and placed on conveyor sections, are also indicated schematically by black boxes. The articles 5 can be separate baggage pieces or containers that hold one or several baggage pieces. Each conveyor belt 6, 7 is here driven by an unregulated, uncontrolled, load-torque-dependent asynchronous motor (not shown) with a fixed, unchangeable desired rotation speed $n_{soll}$.

The process starts at time $t_1$, when nine evenly distributed articles 5 are transported from the conveyor belt 6 in the transport direction 4 to the downstream conveyor belt 7. Because the actual rotation speed $n_{ist}(t)$ of the asynchronous motor depends on the load torque, the speeds of the conveyor belts 6, 7 at time $t_1$ are different. In other words, the empty conveyor belt 7 runs faster than the conveyor belt 6 which carries the weight of the nine articles 5. At time $t_2$, the first article 8 in the transport direction 4 is transferred to the downstream conveyor belt 7, so that at time $t_2$, eight articles 5 are transported on the first conveyor belt 6. The actual rotation speed $n_{ist}(t)$ of the asynchronous motor and hence also the actual transport speed $v_{ist}(t)$ of the conveyor belt 7 is reduced relative to the actual rotation/transport speed at time $t_1$ due to the weight of the first article 8. Consequently, the actual rotation speed $n_{ist}(t)$ of the asynchronous motor and hence also the actual transport speed $v_{ist}(t)$ of the conveyor belt 6 have increased relative to the corresponding rotation/transport speed at time $t_1$, since only eight articles 5 are transported.

At time $t_3$, the conveyor belt 7 transports two articles 5 and the conveyor belt 6 seven articles 5. The actual transport speed $v_{ist}(t)$ of the conveyor belt 6 increases further relative to the transport speed at time $t_2$, whereas the actual transport speed $v_{ist}(t)$ of the downstream conveyor belt 7 is further reduced since it received the second article 9. Due to the change in the actual transport speed $v_{ist}(t)$ of the conveyor belt 7 from the time $t_2$ to the time $t_3$, the first article 8 has been transported at a faster pace by the conveyor belt 6 than the second article 9. As a result, the resulting spacing 10 between the first article 8 and the second article 9 on the conveyor belt 7 is greater than the spacing that existed between the first article 8 and the second article 9 at the time $t_1$ on the conveyor belt 6.

After the transfer of the third article 11, as seen in the transport direction 4 from the conveyor belt 6 to the conveyor belt 7, the actual transport speed $v_{ist}(t)$ of the conveyor belt 6 again increases, whereas the trailing conveyor belt 7 again slows down. As a result, the spacing between the second article 9 and the third article 11 is smaller than the spacing 10.

At time $t_5$, the actual transport speed $v_{ist}(t)$ of the conveyor belt 6 is approximately equal to the actual transport speed of the conveyor belt 7. At the times $t_6$, $t_7$, $t_8$, $t_9$, the actual transport speed $v_{ist}(t)$ of the conveyor belt 6 increases from one point in time to the next, while the actual transport speed $v_{ist}(t)$ of the conveyor belt 7 decreases accordingly, so that two articles 5 collide with each other on the conveyor belt 7, as illustrated for the time $t_9$.

It would be desirable and advantageous to provide a more cost-effective conveyor belt system and a method for operating such conveyor belt system which obviates prior art shortcomings and is able to provide a constant throughput and also function as an intermediate storage unit.

SUMMARY OF THE INVENTION

According to one aspect of the invention, a conveyor system for transporting articles, in particular for transporting containers holding baggage pieces, includes at least two sequentially arranged endless conveyor belts to define an upstream conveyor belt and a downstream conveyor belt for transport of articles in a transport direction from the upstream conveyor belt to the downstream conveyor belt, a drive unit having a first drive motor operatively connected to the upstream conveyor belt and a second drive motor operatively connected to the downstream conveyor belt, and a control unit for regulating a rotation speed of the first drive motor in dependence on a weight determination commensurate with a presence or absence of articles positioned on the upstream conveyor belt, and for regulating a rotation speed of the second drive motor in dependence on a weight determination commensurate with a presence or absence of articles positioned on the downstream conveyor belt.

According to another aspect of the invention, a method for controlling a conveyor system for transporting articles, in particular for transporting a container holding baggage pieces, with at least two sequentially arranged endless conveyor belts to define an upstream conveyor belt and a downstream conveyor belt for transport of articles in a transport direction from the upstream conveyor belt to the downstream conveyor belt, includes the steps of driving each conveyor belt with a drive motor having a rotation speed that depends on a load torque, determining a weight of the articles located on the conveyor belts, and controlling a rotation speed of the drive motors in dependence on the weight of articles positioned on the conveyor belts.

According to another feature of the present invention, the actual rotation speed of the drive motor which depends on the load torque and hence also the actual conveyor speed of the conveyor belt is held constant by a controllably changing the desired rotation speed when the load torque changes. This eliminates the need for a feedback of the actual rotation speed, or an equivalent parameter.

According to one variation of the present invention, the weight can be determined based on the number of the articles located on the conveyor belt.

According to another variation of the invention, the weight may be determined by the number of the articles multiplied by the average weight of the articles. If the individual weight of the articles is not known, then an average weight is used which can be determined empirically or statistically. This feature is particularly advantageous for conveyors transporting containers, because the containers are significantly heavier than the articles held in the containers, so that a determination of the weight of the articles themselves is less critical.

The same actual conveyor speed can be set for each conveyor belt section by increasing the desired rotation speed of the drive motor that drives the conveyor belt section with the higher transported weight so as to compensate for any decrease in the actual rotation speed due to the increased weight.

The desired rotation speed of the drive motor can be controlled cost-effectively by implementing the drive motor as an unregulated asynchronous motor that is controlled by a frequency converter. The desired rotation speed can be adjusted by changing the frequency of the converter and/or the motor voltage.

Advantageously, the two conveyor belts form a storage unit for storing or "parking" the articles.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
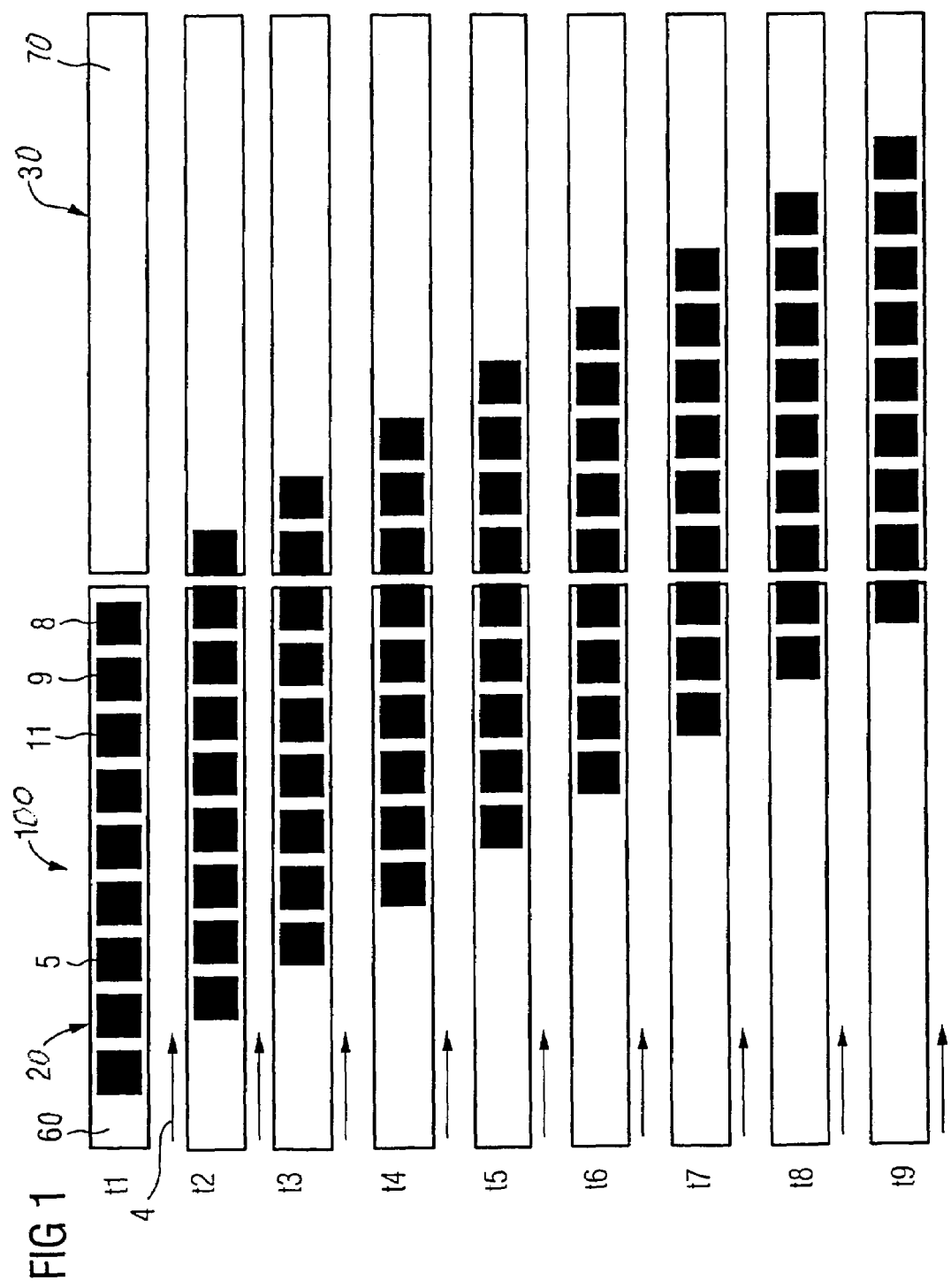
FIG. 1 shows a schematic illustration of a conveyor assembly according to the present invention with two conveyor sections.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a conveyor system according to the invention, generally designated by reference numeral 100 and including an upstream conveyor section 20 and a downstream conveyor section 30. The transport direction is indicated by arrow 4. The conveyor section 20 is essentially represented by a conveyor belt 60 and the conveyor section 30 by conveyor belt 70. Load-torque-dependent asynchronous motors (not shown) drive the conveyor belts 60, 70.

A frequency converter 21 (FIG. 2) supplies electric power to the asynchronous motors with a changeable frequency $f_{soll}(t)$ and/or a changeable voltage $U_{soll}(t)$ that regulate the desired rotation speed $n_{soll}(t)$ of the asynchronous motor. The desired rotation speed $n_{soll}(t)$ of an asynchronous motor operatively coupled with a conveyor belt 60, 70 is adjusted depending on the total weight of the articles 5 transported by a corresponding conveyor belt 60, 70. The change in the actual rotation speed □v caused by a change in the load torque is compensated according to the characteristic torque curves of the asynchronous motors. For this purpose, the frequency converter 21 associated with the respective asynchronous motor changes the frequency and/or voltage supplied to the asynchronous motor to compensate for the change □v in the actual rotation speed.

The articles 5 received from and transferred to each conveyor section 60, 70 are detected and/or counted by a suitable sensor electronics, such as a barcode scanner or a light barrier. In this way, the type and/or the quantity of articles 5 located on a respective conveyor section 60, 70 is always known.

At time $t_1$, the desired rotation speed $n_{soll}(t)$ of the asynchronous motor of the conveyor belt 60 is set to be greater than the desired rotation speed $n_{soll}(t)$ of the asynchronous motor of the downstream conveyor belt 70. Since the conveyor belt 60 is loaded by the weight of the nine articles 5, the actual rotation speed $n_{ist}$ and hence also the actual transport speed $v_{ist}$ of the conveyor belt 60 correspond to the actual rotation speed $n_{ist}$ and hence also the actual transport speed $v_{ist}$ of the conveyor belt 70 which does not yet carry any articles. As a result, both conveyor belts 60, 70 run synchronously at the same speed.

At time $t_2$, a first article 8 is transferred to the downstream conveyor belt 70 so that the conveyor belt 60 now carries eight articles 5. Compared to the time $t_1$, the conveyor belt 60 is regulated with a smaller desired rotation speed $n_{soll}(t)$, since the total transported weight has been reduced. Conversely, the desired rotation speed $n_{soll}(t)$ of the asynchronous motor of conveyor belt 70 is higher than at time $t_1$, since the increased weight of the first article 8 loads the conveyor belt 7. The changes in the desired rotation speeds $n_{soll}(t)$ of the asynchronous motors is selected so that the actual transport speed $v_{ist}$ does not change from time $t_1$ to time $t_2$. As a result, the two conveyor belts 60, 70 still operate at the same speed.

At time $t_3$, a second article 9 is transferred to the downstream conveyor belt 70. As the conveyor belts 60, 70 run synchronously with the same actual transport speed $v_{ist}$, the two leading articles 8, 9 are spaced equidistantly from each other at the same identical spacing they had at time $t_1$.

The load torques $M_R(t)$ for the two conveyor belts 60, 70, which change at the times $t_3, t_4, t_5, t_6, t_7, t_8$ and $t_9$, whereby the load torque $M_R(t)$ at the upstream conveyor belt 60 successively decreases and likewise increases at the downstream conveyor belt 70, do not affect the actual transport speeds $v_{ist}$ of the respective conveyor sections 20, 30 because the respective asynchronous motors are controlled so as to compensate for these changes.

Figure 2:
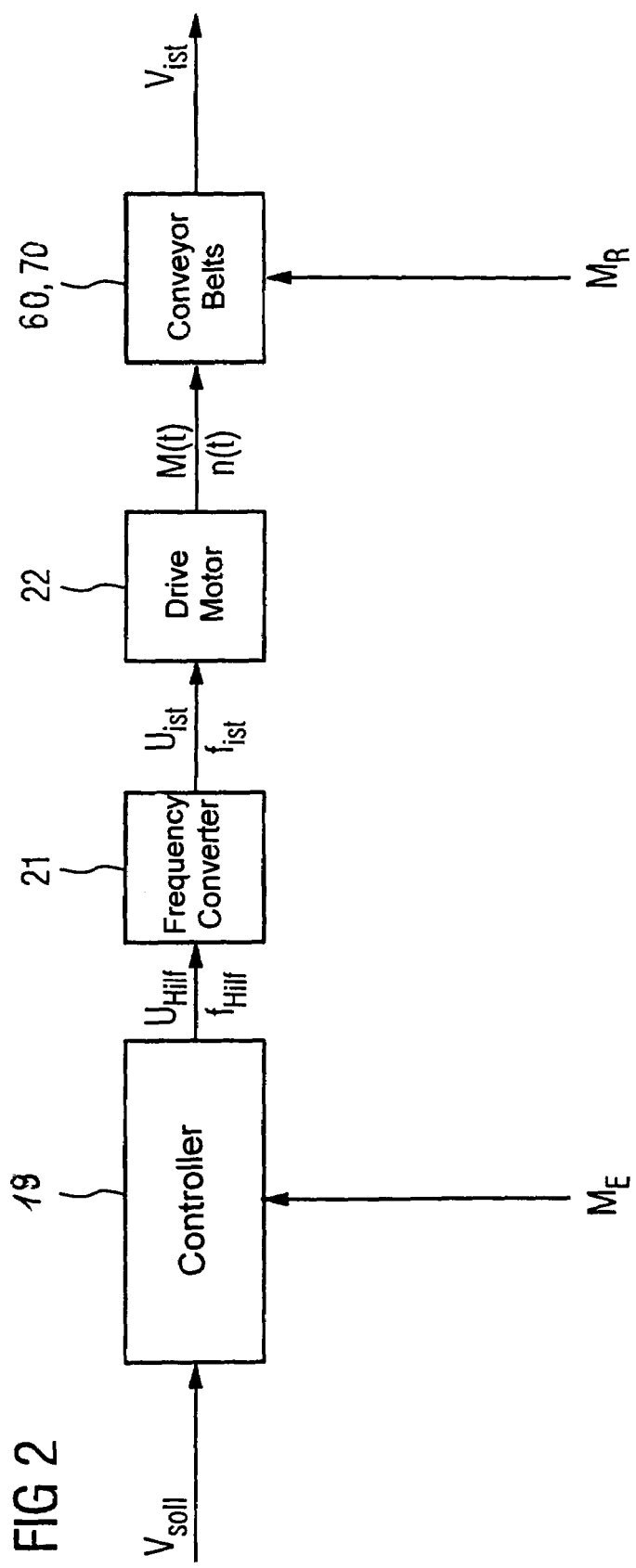
FIG. 2 is a block circuit diagram of a control path of a conveyor section according to FIG. 1.
Figure 3:
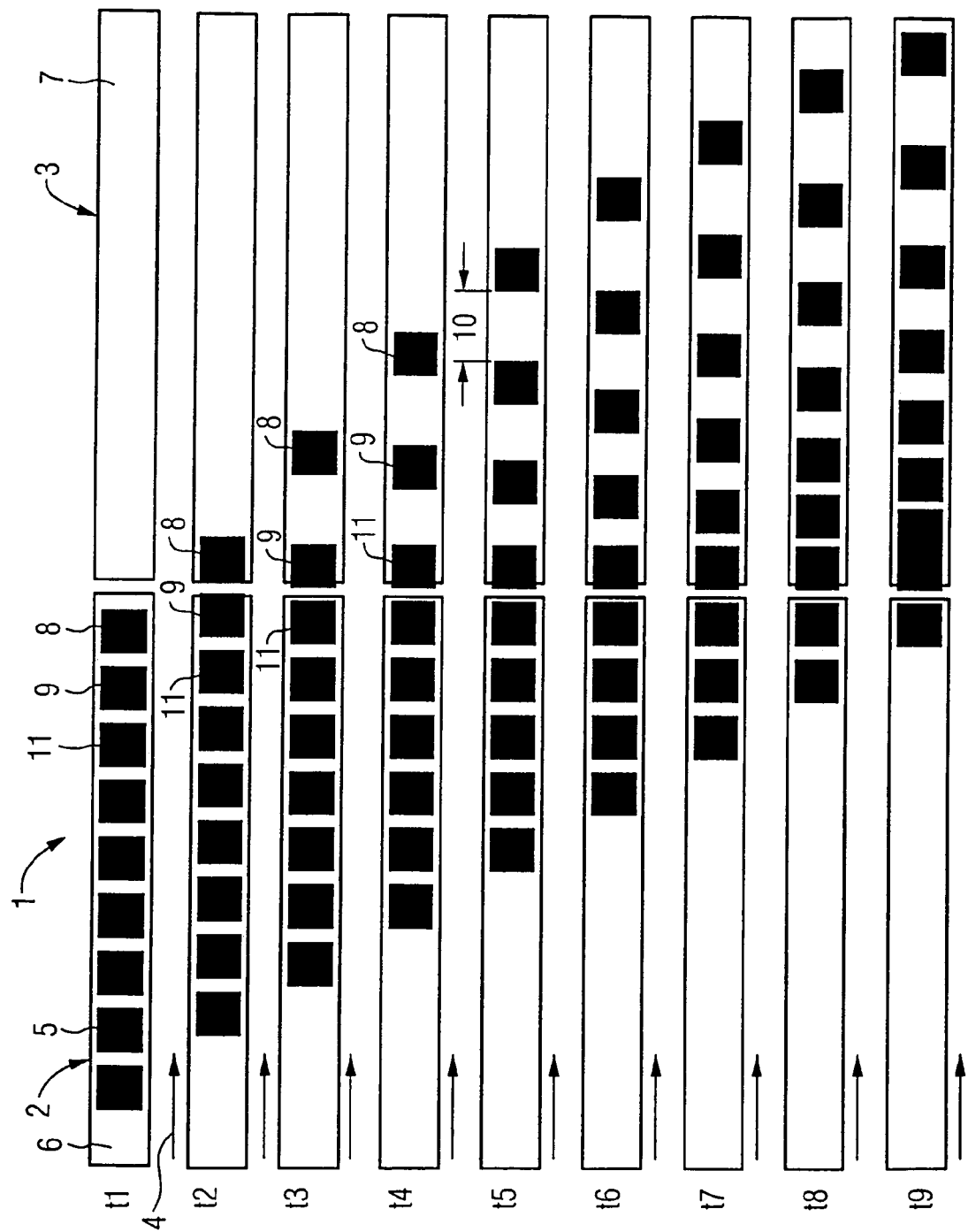
FIG. 3 shows a schematic illustration of a conventional conveyor assembly with two conveyor sections.

FIG. 2 shows schematically a block circuit diagram for controlling the articles 5 that are transported on the conveyor section 20, 30 of the conveyor belt 60, 70. A controller 19 controls the frequency converter 21 which affects the load-torque-dependent drive motor 22 via the supply voltage and/or frequency, so that the drive motor 22 supplies a desired rotation speed $n_{soll}(t)$ to a conveyor belt 60, 70, which transports the articles 5 with a transport speed v.

A predetermined desired transport speed $v_{soll}$ is provided to the controller 19 as a constant control parameter; the control parameter links an estimated or calculated load torque $M_E(t)$, which basically represents the true load torque $M_R(t)$, with the desired transport speed $v_{soll}$ and generates therefrom an auxiliary voltage $U_{Hilf}(t)$ and an auxiliary frequency $f_{Hilf}(t)$ for a control element connected downstream, i.e. the frequency converter 21. The frequency converter 21 operating as a control element transforms the auxiliary voltage $U_{Hilf}(t)$ and the auxiliary frequency $f_{Hilf}(t)$ into a voltage $U_{ist}(t)$ and a frequency $f_{ist}(t)$ for the drive motor 22. The drive motor 22 assumes under the actual load torque $M_R(t)$ an actual rotation speed $n_{ist}$, which drives the conveyor belt 60, 70 with an actual transport speed $v_{ist}$. The motor rotation speed $n_{ist}$ depends on the load torque, i.e., the actual transport speed $v_{ist}$ is a function of the voltage $U_{ist}(t)$ and the frequency $f_{ist}(t)$, which was determined by the controller 19 as a function of the articles 5 to be transported by the conveyor belt 60, 70.

The estimated or calculated load torque $M_E(t)$ of each control path can hereby be determined by different methods. If the individual weights of the articles 5 on a conveyor belt 60, 70 are known, then the total weight can be easily determined from the sum of the individual weights. If only some of the weights are known while others are unknown, average values are assumed for the weights of the articles 5 whose weight is not known, whereafter the sum is computed. If none of the weights of the articles 5 are known, the total weight can be determined by multiplying the quantity of the articles 5 transported on the conveyor belts 60, 70 by an average weight of the articles. For each total weight, the change in the actual rotation speed □v as compared to the unloaded actual rotation speed can be determined from the characteristic torque curve of the asynchronous motor, and the actual rotation speed derived from the characteristic curve can then be supplied to the controller 19.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A conveyor system for transporting articles, in particular for transporting containers holding baggage pieces, comprising:

at least two sequentially arranged endless conveyor belts to define an upstream conveyor belt and a downstream conveyor belt for transport of articles in a transport direction from the upstream conveyor belt to the downstream conveyor belt;

a drive unit having a first drive motor operatively connected to the upstream conveyor belt and a second drive motor operatively connected to the downstream conveyor belt, said first and second drive motors each having an unregulated, load-torque-dependent rotation speed; and a control unit for setting a desired rotation speed for each motor, wherein the set rotation speed of the first drive motor depends on a weight of articles positioned on the upstream conveyor belt, and wherein the set rotation speed of the second drive motor depends on a weight of articles positioned on the downstream conveyor belt.

2. The conveyor system of claim 1, wherein the weight is determined by multiplying a quantity of the articles with an average weight of the articles.

3. The conveyor system of claim 1, wherein the control unit compensates a decrease in rotation speed in response to an increase in weight of the articles on the conveyor belts through an increase of a desired rotation speed of the associated drive motor, and compensates an increase in rotation speed in response to a decrease in weight of the articles on the conveyor belts through a decrease of a desired rotation speed of the associated drive motor.

4. The conveyor system of claim 3, and further comprising a frequency converter receiving an output signal from the control unit and controlling the drive motor, wherein the desired rotation speed is adjusted by changing a frequency of the frequency converter and/or a supply voltage of the drive motor.

5. The conveyor system of claim 3, wherein the drive motor is an unregulated asynchronous motor.

6. The conveyor system of claim 1, wherein the conveyor belts form a storage unit for the articles.

* * * * *